(12) United States Patent
Fujikawa

(10) Patent No.: US 12,055,826 B2
(45) Date of Patent: Aug. 6, 2024

(54) ELECTRO-OPTICAL DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/405,015

(22) Filed: Aug. 17, 2021

(65) Prior Publication Data

US 2022/0057666 A1 Feb. 24, 2022

(30) Foreign Application Priority Data

Aug. 18, 2020 (JP) ................................ 2020-137860

(51) Int. Cl.
*G02F 1/1345* (2006.01)
(52) U.S. Cl.
CPC ...... *G02F 1/13458* (2013.01); *G02F 1/13452* (2013.01); *G02F 1/13456* (2021.01)
(58) Field of Classification Search
CPC ....................................... G02F 1/13452–13458
See application file for complete search history.

(56) References Cited

U.S. PATENT DOCUMENTS

| 9,360,719 B2* | 6/2016 | Ikuta ................... G02F 1/13452 |
| 2007/0275578 A1* | 11/2007 | Yamada ................. H05K 3/361 |
| | | 439/79 |
| 2016/0270225 A1 | 9/2016 | Shinohara |
| 2016/0381801 A1 | 12/2016 | Saruyama et al. |
| 2017/0271293 A1 | 9/2017 | Heo et al. |
| 2018/0190225 A1* | 7/2018 | Chen ................... G02F 1/13452 |
| 2020/0008304 A1 | 1/2020 | Araki |
| 2022/0066252 A1* | 3/2022 | Fujikawa ............ G02F 1/13454 |

FOREIGN PATENT DOCUMENTS

| JP | H04352132 | 12/1992 |
| JP | H10260421 | 9/1998 |
| JP | 2018093194 | 6/2018 |
| JP | 2019009129 | 1/2019 |
| JP | 2020038993 | 3/2020 |

* cited by examiner

*Primary Examiner* — Dung T Nguyen
(74) *Attorney, Agent, or Firm* — JCIPRNET

(57) ABSTRACT

An electro-optical device includes a liquid crystal panel, and a printed circuit board that is electrically coupled to a terminal portion of the liquid crystal panel by electrically conductive particles arranged in a state of being aligned as viewed in plan view, wherein the terminal portion has a plurality of panel terminals arranged along a first direction extending along one side of the liquid crystal panel, the panel terminal has a long side extending along a second direction obliquely intersecting with the first direction and a short side extending along a direction intersecting with the second direction, and an arrangement direction of the electrically conductive particles is arranged along a third direction intersecting with the second direction.

7 Claims, 12 Drawing Sheets

ELECTRO-OPTICAL DEVICE AND ELECTRONIC APPARATUS

The present application is based on, and claims priority from JP Application Serial Number 2020-137860, filed Aug. 18, 2020, the disclosure of which is hereby incorporated by reference herein in its entirety.

BACKGROUND

1. Technical Field

The disclosure relates to an electro-optical device and an electronic apparatus.

2. Related Art

As the electro-optical device, there has been known an active drive type liquid crystal device that includes switching elements each provided for each pixel. For example, such a liquid crystal device is used as a light valve of a projector as an electronic apparatus.

The liquid crystal device includes a liquid crystal panel having a display region in which a plurality of pixels are arranged. A flexible wiring substrate (flexible printed circuit: FPC) is connected to terminals of the liquid crystal panel via an anisotropic conductive film (ACF). A drive signal, a drive voltage, and a video signal are supplied to the liquid crystal panel from an upper circuit through the flexible wiring substrate.

Recently, along with the miniaturization and a demand for high definition of a liquid crystal device and other electronic apparatus, attempts to make a wiring pitch of a printed circuit board and a pitch of electrode terminals of an electronic component fine have been in progress, and an anisotropic conductive film is also requested to follow such attempts to make the pitches fine. However, when electrically conductive particles are filled in the anisotropic conductive film at high density in order to ensure the electrical conduction also in a narrow space between electrode terminals with certainty in a state where the electrically conductive particles are sandwiched between the electrode terminals, a rate of occurrence of short circuiting between terminals is increased since the electrically conductive particles dispersed between the electrode terminals are continuously arranged. In view of such circumstances, there has been developed an anisotropic conductive film capable of preventing the occurrence of short circuiting between terminals that is caused by such continuously arranged electrically conductive particles in a space between terminals of connection electrodes that are disposed at a fine pitch. As an anisotropic conductive film adaptable to such a fine pitch, for example, JP-A-2020-38993 discloses an anisotropic conductive film in which electrically conductive particles are regularly arranged in a predetermined arrangement pattern (hereinafter, referred to as a particle aligned type anisotropic conductive film).

However, when a panel size is miniaturized without changing the resolution of the liquid crystal panel or when the resolution is increased without changing the panel size, it is necessary to optimize sizes such as a width and a length and a terminal pitch of connection terminals for connection with an external printed circuit board such as a flexible wiring substrate corresponding to narrowing of a terminal region brought about by the miniaturization of the panel size and the increase of the number of terminals brought about by higher resolution.

In such a case, it is also necessary to change a particle aligned type anisotropic conductive film to be used to an appropriate type in conformity with a size and an arrangement pitch of connection terminals of a liquid crystal panel. However, from a viewpoint of a manufacture who manufactures many types of liquid crystal panels that differ from each other in panel size and resolution, the preparation of many types of particle aligned type anisotropic conductive films in conformity with various types of liquid crystal panels increases a burden in terms of cost. Accordingly, there is a demand for using the same particle aligned type anisotropic conductive film in common for various types of liquid crystal panels as much as possible.

This is because, when a particle aligned type anisotropic conductive film that conforms with a size and a terminal pitch of a connection terminal of a liquid crystal panel cannot be used, the number of electrically conductive particles 71 sandwiched in the terminal is extremely decreased or the number of electrically conductive particles 71 becomes irregular among the terminals so that a connection failure occurs between the liquid crystal panel and the flexible wiring substrate.

SUMMARY

An electro-optical device includes: an electro-optical panel; and a printed circuit board that is electrically coupled to a terminal portion of the electro-optical panel by electrically conductive particles arranged in a state of being aligned as viewed in plan view, wherein the terminal portion has a plurality of terminals arranged in a first direction along one side of the electro-optical panel, the terminal has a long side extending along a second direction obliquely intersecting with the first direction and a short side extending along a direction intersecting with the second direction, and with respect to an arrangement direction of the electrically conductive particles, the electrically conductive particles are arranged along a third direction intersecting with the second direction.

An electronic apparatus includes the above-described electro-optical device.

DESCRIPTION OF EXEMPLARY EMBODIMENTS

First Embodiment

Figure 1:
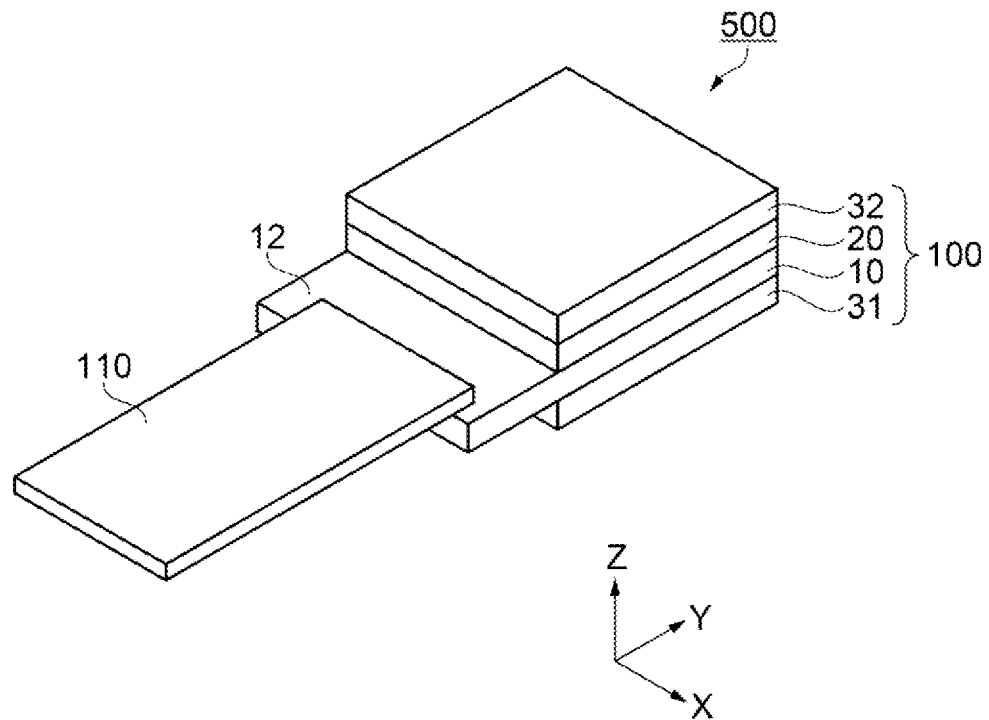
FIG. 1 is a perspective view illustrating a configuration of a liquid crystal device.
Figure 2:
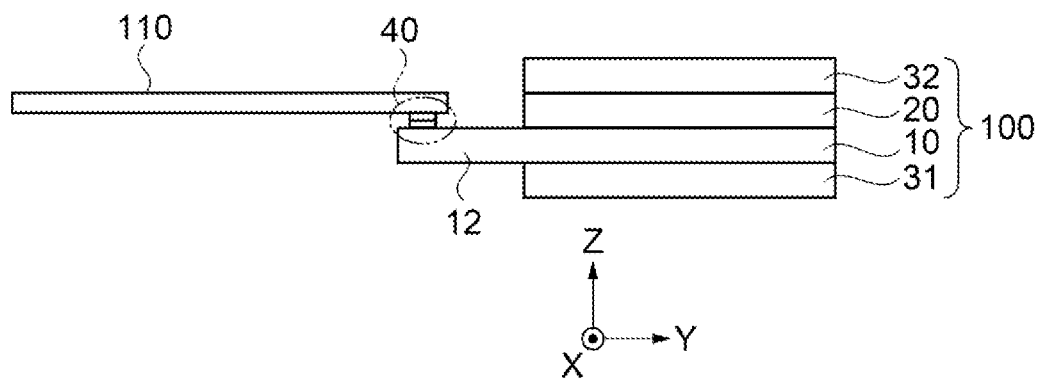
FIG. 2 is a side view illustrating the configuration of the liquid crystal device illustrated in FIG. 1.

As illustrated in FIG. 1 and FIG. 2, a liquid crystal device 500 as an electro-optical device includes a liquid crystal panel 100 as an electro-optical panel, and a printed circuit board 110 connected to one side of the liquid crystal panel 100. Here, in FIG. 1 and FIG. 2, the description of some constitutional elements is omitted when appropriate provided that such omission of the description does not obstruct the description of the configuration, the manner of operation, and the advantageous effects of the disclosure. For example, the liquid crystal device 500 is used as a light valve of a projector 1000 as an electronic apparatus described later.

The liquid crystal panel 100 includes a plurality of pixels that are arranged in a matrix array in an X direction and a Y direction in a display region, and the description of the plurality of pixels is omitted. The liquid crystal panel 100 is an active drive type liquid crystal panel. Hereinafter, for the sake of convenience of the description, the description is made using an X-axis, a Y-axis, and a Z-axis which are orthogonal to each other when necessary. A direction along the X axis is described as an X direction. In the same manner, a direction along the Y axis is described as a Y direction, and a direction along the Z axis is described as a Z direction. Additionally, in the following description, viewing in the Z direction is referred to as "as viewed in plan view", and viewing in a direction perpendicular to a cross section including the Z axis is referred to as "as viewed in cross section".

Although not illustrated in the drawings, in respective pixels, a pixel electrode, a switching element, a counter electrode, a holding capacitor and the like are provided correspondingly. The switching element is configured to control switching of the pixel electrode. The counter electrode faces the pixel electrode via a liquid crystal layer. The pixel electrodes, the switching elements, and the holding capacitors are mounted on an element substrate 10. For example, the switching element is a thin film transistor (TFT). The counter electrode is mounted on a counter substrate 20 at least over a display region such that the counter electrode faces the plurality of pixel electrodes. The pixel electrodes and the counter electrode are each formed using a transparent conductive film made of indium tin oxide (ITO), indium zinc oxide (IZO) or the like, for example.

Terminal portions 40 are disposed on an overhang portion 12 of the element substrate 10. The terminal portion 40 is a portion where a panel terminal 50 (see FIG. 3) that forms the terminal of the liquid crystal panel 100 and an external terminal 60 (see FIG. 3) of the printed circuit board 110 are electrically coupled to each other. For example, the printed circuit board 110 is a flexible board such as a flexible wiring substrate (flexible printed circuit: FPC). Although not illustrated in the drawings, a driving IC is mounted on the printed circuit board 110. The driving IC may not be mounted on the printed circuit board 110.

As illustrated in FIG. 1 and FIG. 2, a first dustproof substrate 31 is disposed on an element substrate 10 side of the liquid crystal panel 100. A second dustproof substrate 32 is disposed on a counter substrate 20 side of the liquid crystal panel 101.

Figure 3:
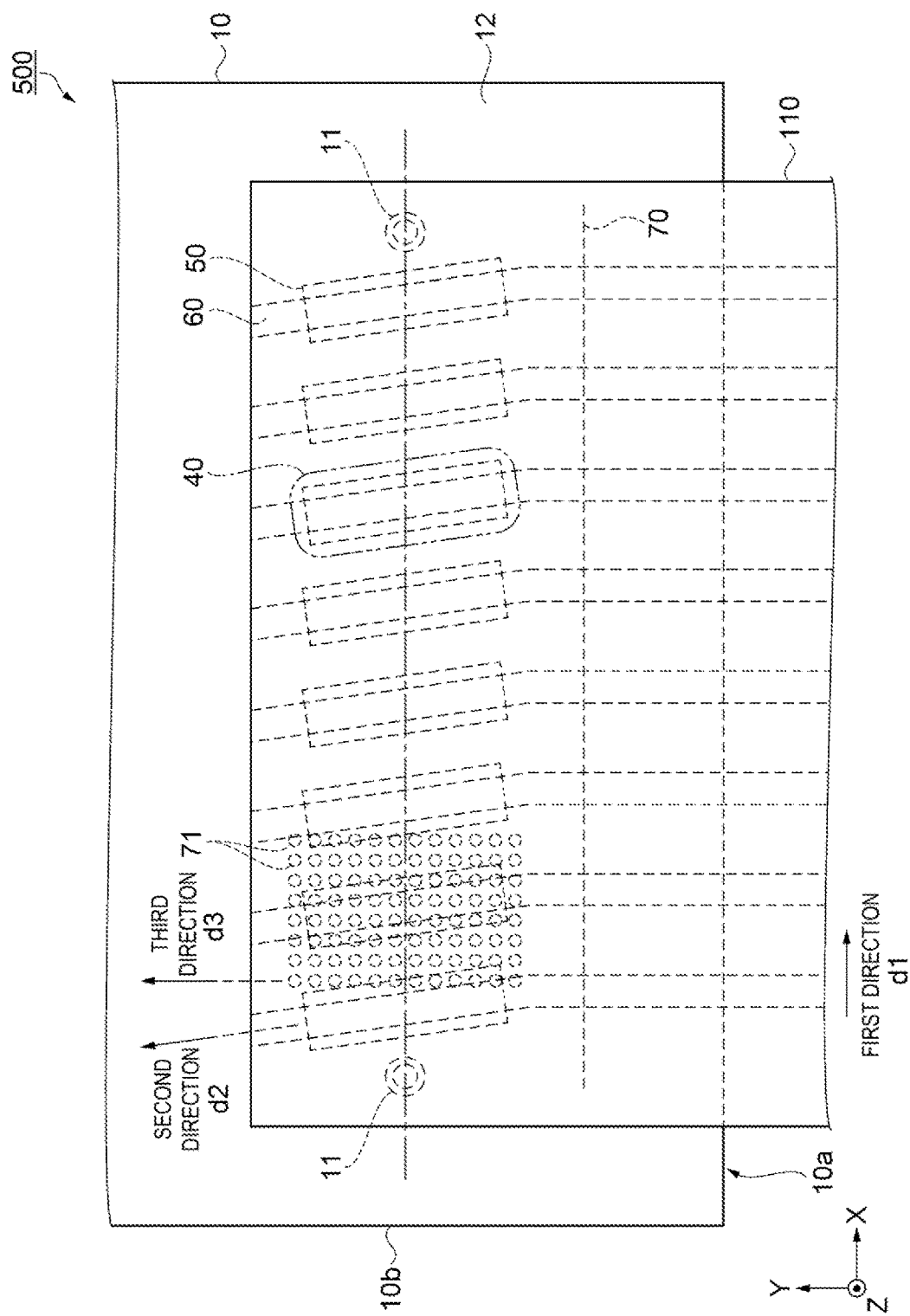
FIG. 3 is a plan view illustrating a configuration of a terminal portion of the liquid crystal device of a first embodiment.

As illustrated in FIG. 3, a group of terminals having a plurality of terminal portions 40 is mounted on the overhang portion 12 of the element substrate 10. The terminal portion 40 includes the panel terminal 50 formed on the liquid crystal panel 100, the external terminal 60 formed on the printed circuit board 110, and the particle aligned type anisotropic conductive film (ACF) 70 for electrically connecting the panel terminal 50 and the printed circuit board 110 to each other. Further, on both sides of the group of terminals having the plurality of terminal portions 40, an alignment mark 11 for alignment of the panel terminals 50 and the external terminals 60 is disposed respectively.

Figure 4:
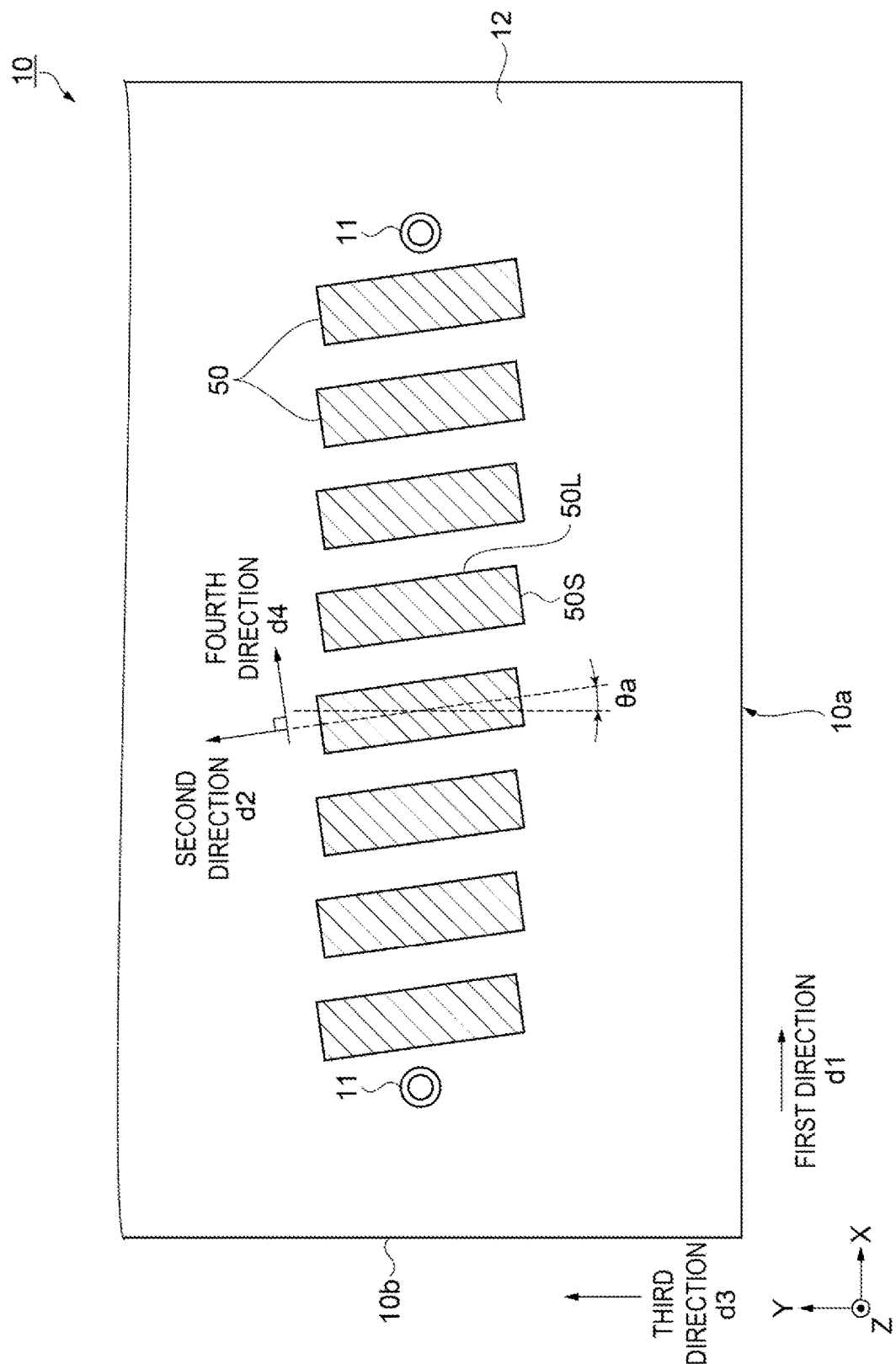
FIG. 4 is a plan view illustrating a configuration of a terminal portion of a liquid crystal panel.

As illustrated in FIG. 4, on the overhang portion 12 of the element substrate 10, the plurality of panel terminals 50 are arranged along a first direction d1 (X direction) extending along one side 10a of the element substrate 10. Long sides 50L of the plurality of panel terminals 50 are arranged in an inclined manner at an angle θa with respect to a third direction d3 (Y direction) extending along an end side 10b of the element substrate 10. Specifically, the panel terminal 50 has the long sides 50L extending along the second direction d2 obliquely intersecting with the first direction d1, and short sides 50S extending along a fourth direction d4 that is orthogonal to the second direction d2.

Figure 5:
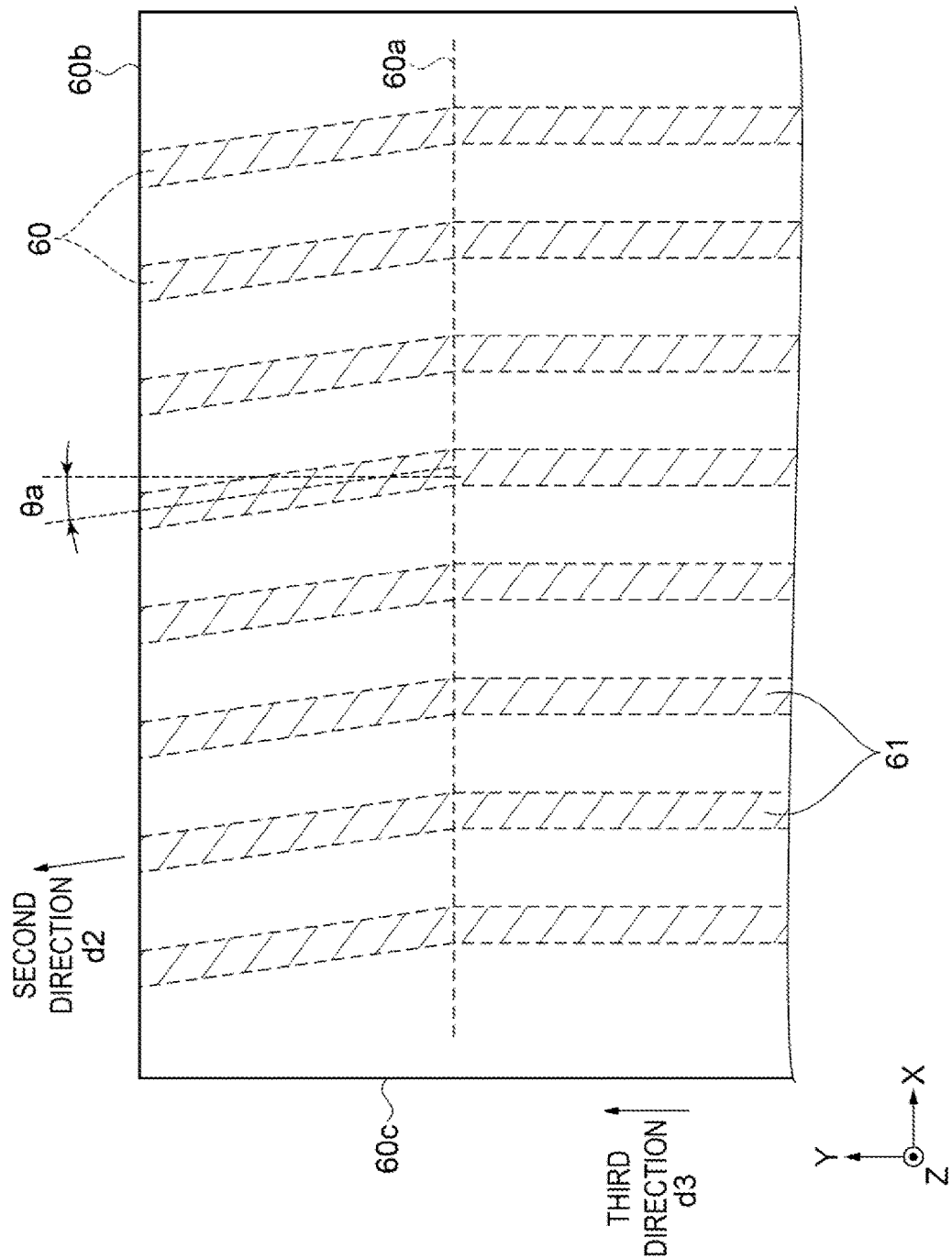
FIG. 5 is a plan view illustrating a configuration of an external terminal of a printed circuit board.

As illustrated in FIG. 5, the external terminals 60 of the printed circuit board 110 are portions of lines 61 formed of a patterned copper foil where an insulating film covering the line 61 on a distal end side (an end side 60b side) from a bent portion 60a is removed. The external terminals 60 are each inclined at an angle θa with respect to an end side 60c of the printed circuit board 110 between the bent portion 60a and the end side 60b. Further, when the printed circuit board 110 is bonded to the overhang portion 12 of the element substrate 10, the printed circuit board 110 and the element substrate 10 are bonded to each other in a state that the external terminals 60 and the panel terminals 50 are inclined at the angle θa with respect to the end side 10b of the element substrate 10 extending along the third direction d3 (Y direction) (see FIG. 3). In the present embodiment, the lines 61 are not inclined except for the portions forming the external terminals 60, and are arranged parallel to an extending direction (third direction d3) of the end side 60c of the printed circuit board 110. The printed circuit board 110 and the element substrate 10 are bonded to each other such that the bent portions 60a of the external terminals 60 are positioned on a one side 10a side of the element substrate 10 with respect to the panel terminals 50 (see FIG. 3).

Figure 7:
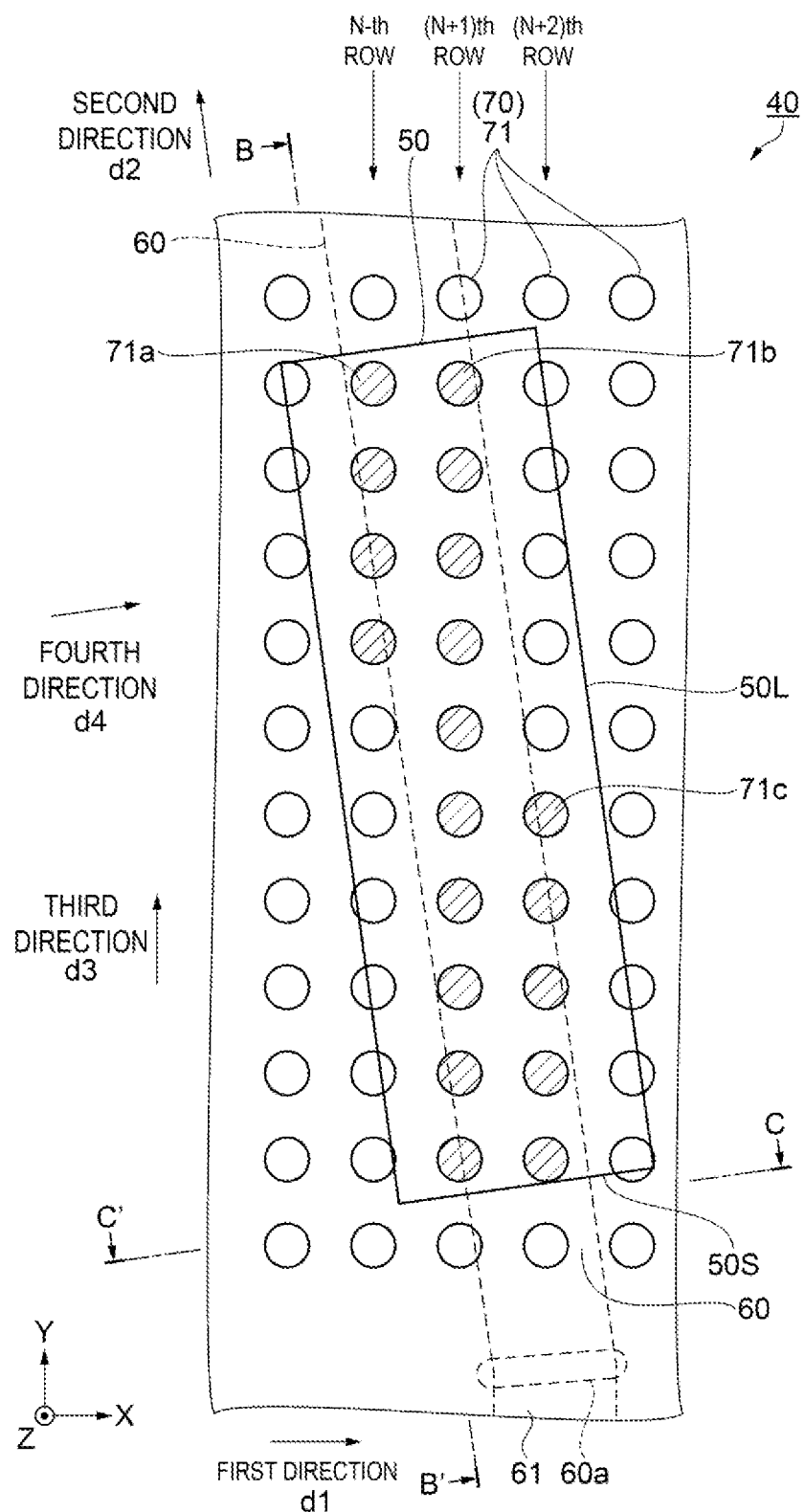
FIG. 7 is a plan view illustrating a state in which the liquid crystal panel and the printed circuit board are connected to each other via the particle aligned type anisotropic conductive film.

The bent portions 60a of the respective lines 61 are described. By setting a line segment connecting the bent portions 60a of the respective lines 61 parallel to the end side 60b as illustrated in FIG. 5, and by inclining a line segment connecting two bent points constituting the bent portion 60a of each line 61 in a counterclockwise direction with respect to the end side 60b as illustrated in FIG. 7, a width of the line 61 satisfies the relationship that the width of the line 61 in a region where the line 61 extends in a direction along the third direction d3 (Y direction) is smaller than the width of the line 61 in a region where the line 61 extends along the second direction d2. On the other hand, by setting the line segment connecting the two bent points constituting the bent portion 60a of each line 61 parallel to the end side 60b, the width of the line 61 satisfies the relationship that the width of the line 61 in the region where the line 61 extends in the direction along the third direction d3 (Y direction) is larger than the width of the line 61 in the region where the line 61 extends along the second direction d2. In any case, by setting the width of the line 61 such that the width of the line 61 in the region where the line 61 extends in the direction along the third direction d3 (Y direction) and the width of the line 61 in the region where the line 61 extends along the second direction different from each other, the line segment connecting the bent portions 60a of the respective lines 61 becomes parallel to the end side 60b and hence, it is unnecessary to increase a length of the printed circuit board 110 more than necessary or it is unnecessary to bent the printed circuit board 110.

By inclining the line segment that can be formed by connecting the bent portions 60a of the respective lines 61 in the counterclockwise direction with respect to the end side 60b, and by inclining the line segment that connects two bent points constituting the bent portion 60a of each line 61 in the counterclockwise direction with respect to the end side 60b, the width of the line 61 can be also set such that the width of the line 61 in the region where the line 61 extends in the direction along the third direction d3 (Y direction) and the width of the line 61 in the region where the line 61 extends along the second direction are equal to each other.

Figure 6:
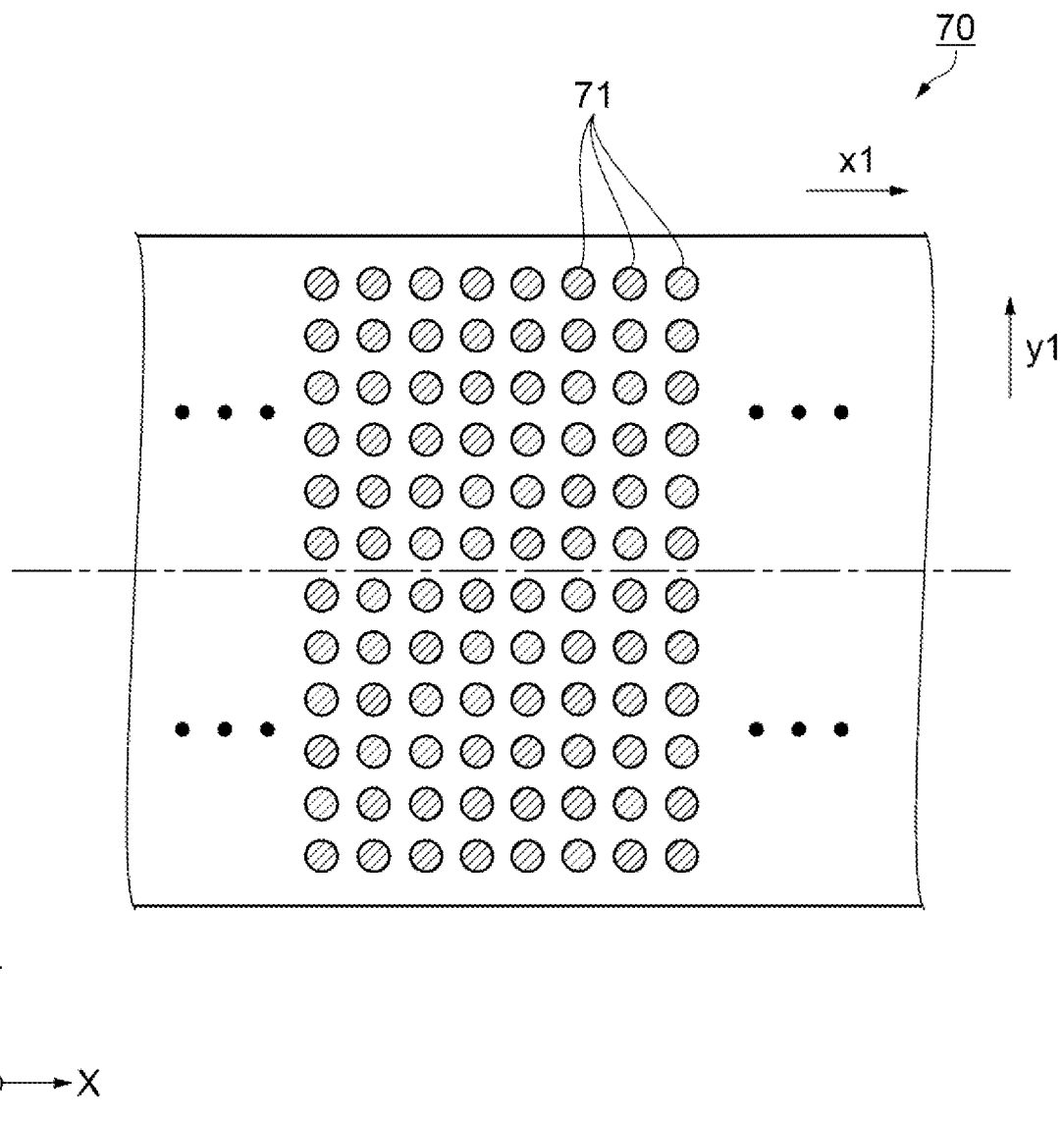
FIG. 6 is a plan view illustrating a configuration of a particle aligned type anisotropic conductive film.

As illustrated in FIG. 6, in the particle aligned type anisotropic conductive film 70, electrically conductive particles 71 are arranged such that the electrically conductive particles 71 are regularly aligned in a predetermined arrangement pattern as viewed in plan view, and specifically, the electrically conductive particles 71 are arranged in a matrix array and at equal intervals in a direction x1 that is parallel to a longitudinal direction of the particle aligned type anisotropic conductive film 70 and in a direction y1 orthogonal to the direction x1. When the particle aligned type anisotropic conductive film 70 is adhered to the liquid crystal panel 100, the particle aligned type anisotropic conductive film 70 is adhered to the overhang portion 12 of the liquid crystal panel 100 such that arrangement directions (x1, y1) of the electrically conductive particles 71 are aligned with the first direction d1 extending along the one side 10a (see FIG. 4) of the element substrate and the third direction d3 orthogonal to the first direction d1 respectively.

In the present embodiment, "the electrically conductive particles 71 are regularly arranged in a predetermined arrangement pattern" means that regularity is given to the arrangement of the plurality of electrically conductive particles 71 on the panel terminal 50. Here, with respect to the arrangement of the electrically conductive particles 71, there may be a case where all electrically conductive particles 71 are not always regularly arranged due to a reason attributed to the manufacture of the particle aligned type anisotropic conductive film 70. Accordingly, there may be a case where, also on the panel terminal 50, some electrically conductive particles 71 deviate from a predetermined arrangement axis or a predetermined arrangement interval. However, such a case should not be construed that the electrically conductive particles 71 are not regularly arranged. Further, among the panel terminals 50, there may be a case where the electrically conductive particles 71 are displaced from the predetermined arrangement axis or the predetermined arrangement interval after compression bonding due to the fluidity of a binder used for forming the particle aligned type anisotropic conductive film 70. However, such a case also should not be construed that the electrically conductive particles 71 are not regularly arranged.

Figure 16:
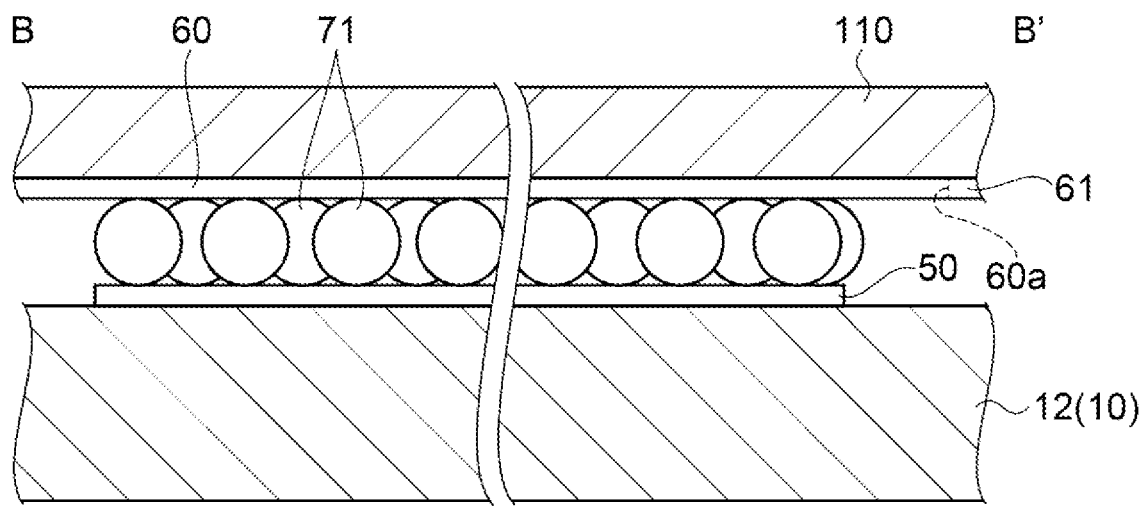
FIG. 16 is a cross-sectional view of the terminal portion illustrated in FIG. 7 taken along a line B-B' in FIG. 7.
Figure 17:
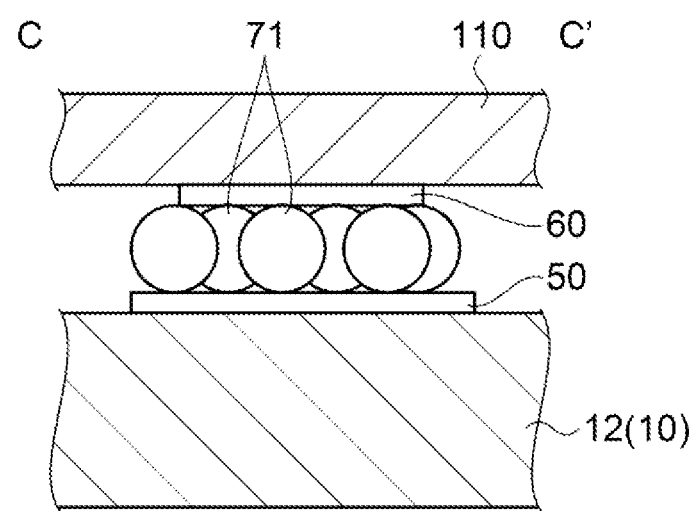
FIG. 17 is a cross-sectional view of the terminal portion illustrated in FIG. 7 taken along a line C-C' in FIG. 7.

FIG. 7 is a plan view illustrating the terminal portion 40 illustrated in FIG. 3 in an enlarged manner. FIG. 16 is a cross-sectional view of the terminal portion 40 when a cross section of the terminal portion 40 taken along a line segment B-B' parallel to the second direction d2 in FIG. 7 is viewed in cross section in the fourth direction d4. FIG. 17 is a cross-sectional view of the terminal portion 40 when a cross section of the terminal portion 40 taken along a line segment C-C' parallel to the fourth direction d4 in FIG. 7 is viewed in cross section in the second direction d2. Here, the fourth direction d4 is a direction parallel to an extending direction of the short side 50S of the panel terminal 50, or a direction orthogonal to an extending direction (second direction) of the long side 50L of the panel terminal 50.

As illustrated in FIG. 7, according to the present embodiment, the panel terminal 50 is disposed on the overhang portion 12 such that the extending direction of the long side 50L of the panel terminal 50 is oblique to the one side 10a (see FIG. 4) of the liquid crystal panel 100. Further, the particle aligned type anisotropic conductive film 70 is disposed such that the arrangement directions (x1, y1) of the electrically conductive particles 71 (see FIG. 6) are aligned with the first direction d1 and the third direction d3 respectively. With such a configuration, the arrangement direction of the electrically conductive particles 71 obliquely intersects with the extending direction (second direction d2) of the long side 50L of the panel terminal 50 and hence, the electrically conductive particles 71 can be arranged densely when the panel terminal 50 is viewed in the direction orthogonal to the long side 50L or the short side 50S of the panel terminal 50 (the fourth direction d4 or the second direction d2). Although it is difficult to freely change the arrangement direction of the electrically conductive particles 71 in the particle aligned type anisotropic conductive film 70, the degree of arrangement density of the electrically conductive particles 71 can be adjusted by adjusting the angle θa and hence, it is possible to obtain an optimal terminal configuration.

In other words, as illustrated in FIG. 16, due to a large number of electrically conductive particles 71 arranged regularly in the first direction d1 and the third direction d3, when the panel terminal 50 is viewed in a direction (fourth direction) orthogonal to the long side 50L of the panel terminal 50, the electrically conductive particles 71 are arranged between the external terminal 60 of the printed circuit board 110 and the panel terminal 50 of the element substrate 10 without gaps and hence, it looks as if there is a continuous conductor crossing between the external terminal 60 and the panel terminal 50.

Further, as illustrated in FIG. 17, due to the large number of electrically conductive particles 71 arranged regularly in the first direction d1 and the third direction d3, when the panel terminal 50 is viewed in a direction (second direction) orthogonal to the short side 50S of the panel terminal 50, the electrically conductive particles 71 are arranged between the external terminal 60 of the printed circuit board 110 and the panel terminal 50 of the element substrate 10 without gaps, it looks as if there is a continuous conductor crossing between the external terminal 60 and the panel terminal 50.

In FIG. 7, the hatched electrically conductive particles 71a, 71b, and 71c indicate the electrically conductive particles 71 which are positioned between the panel terminal 50 and the external terminal 60 and are electrically coupled to both the panel terminal 50 and the external terminal 60. As illustrated in FIG. 7, the electrically conductive particles 71 electrically coupled to both the panel terminal 50 and the external terminal 60 are constituted of the electrically conductive particles 71a on n-th row, the electrically conductive particles 71b on (n+1)th row, and the electrically conductive particles 71c on (n+2)th row. Accordingly, compared to a case where the arrangement directions of the panel terminal 50 and the external terminal 60 are equal to the arrangement direction of the electrically conductive particles 71, the number of rows to which the electrically conductive particles 71 contributing to the electrical connection between the panel terminal 50 and the external terminal 60 belong can be increased.

Therefore, when the external terminal 60 and the panel terminal 50 face each other, a portion where the electrically conductive particle 71 is brought into contact with and sandwiched between the external terminal 60 and the panel terminal 50 can be formed with certainty. With such a configuration, it is possible to increase the certainty of the electrical connection between the panel terminal 50 and the external terminal 60.

The particle aligned type anisotropic conductive film 70 may not adhere in an inclined manner with respect to an outer shape of the liquid crystal panel 100 and hence, at the time of adhering the particle aligned type anisotropic conductive film 70 or at the time of adhering the printed circuit board 110, it is possible to easily ensure a clearance for preventing the particle aligned type anisotropic conductive film 70 from interfering with the counter substrate 20. As a result, the liquid crystal panel 100 is not enlarged. Further, the particle aligned type anisotropic conductive film 70 may not be inclined and hence, for example, the alignment marks 11 for the panel terminals 50 can be used also as alignment marks for the particle aligned type anisotropic conductive film 70 in common so that a space utilization efficiency in the liquid crystal panel 100 can be increased.

Further, the bent portion 60a of the external terminal 60 of the printed circuit board 110 is disposed on the one side 10a side of the element substrate 10 with respect to the panel terminal 50 and hence, even when an alignment deviation attributed to the expansion or the like of the printed circuit board 110 in the X direction occurs due to applying of heat during mounting, it is possible to suppress the occurrence of a phenomenon that the external terminal 60 is unintentionally brought into contact with the panel terminal 50 disposed adjacently to the external terminal 60 thus suppressing the lowering of a manufacturing yield. Still further, on a terminal end side of the printed circuit board 110, the inclination angle of the external terminal 60 is not changed and hence, even when the alignment deviation during mounting occurs in the same manner, it is possible to suppress the occurrence of a phenomenon that the external terminal 60 is brought into contact with the panel terminal 50 disposed adjacently to the external terminal 60.

Figure 8:
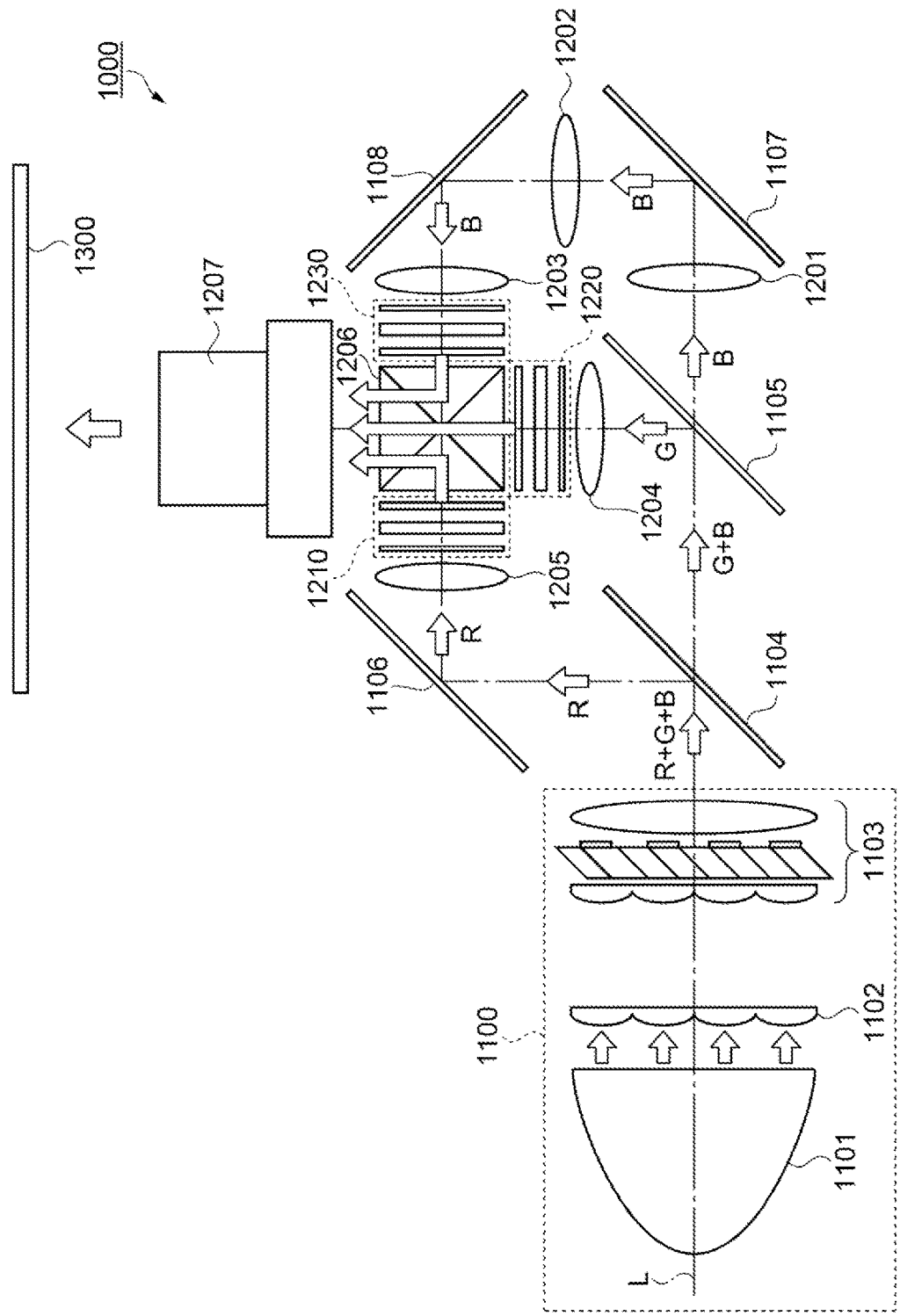
FIG. 8 is a schematic view illustrating a configuration of a projector as an electronic apparatus.

As illustrated in FIG. 8, a projector 1000 as the electronic apparatus of the present embodiment includes a polarized light illumination device 1100 disposed along a system optical axis L, two dichroic mirrors 1104, 1105 as optical separation elements, three reflection mirrors 1106, 1107, and 1108, five relay lenses 1201, 1202, 1203, 1204, and 1205, three transmissive liquid crystal light valves 1210, 1220, and 1230 as three optical modulation units, a cross dichroic prism 1206 as a photosynthesis element, and a projection lens 1207.

The polarized light illumination device 1100 generally includes a lamp unit 1101 being as a light source including a white light source such as an extra-high pressure mercury lamp or a halogen lamp, an integrator lens 1102, and a polarization conversion element 1103.

The dichroic mirror 1104 reflects the red light (R) of a polarized light flux exiting from the polarized light illumination device 1100 and transmits the green light (G) and the blue light (B). The other dichroic mirror 1105 reflects the green light (G) transmitted by the dichroic mirror 1104 and transmits the blue light (B).

The red light (R) reflected by the dichroic mirror 1104 is reflected by the reflection mirror 1106 and is then incident on the liquid crystal light valve 1210 via the relay lens 1205. The green light (G) reflected by the dichroic mirror 1105 is incident on the liquid crystal light valve 1220 via the relay lens 1204. The blue light (B) transmitted by the dichroic mirror 1105 is incident on the liquid crystal light valve 1230 via a light guide system including the three relay lenses 1201, 1202, and 1203 and the two reflection mirrors 1107 and 1108.

The liquid crystal light valves 1210, 1220, and 1230 are each disposed facing an incident surface of each type of color light of the cross dichroic prism 1206. The color light incident on the liquid crystal light valves 1210, 1220, and 1230 is modulated based on video information (video signal) and is emitted toward the cross dichroic prism 1206.

This prism includes four rectangular prisms bonded together, where on inner surfaces of the prisms, a dielectric multilayer film configured to reflect the red light and a dielectric multilayer film configured to reflect the blue light are formed in a cross shape. The three types of color light are synthesized by these dielectric multilayer films, and light representing a color image is synthesized. The synthesized light is projected onto a screen 1300 by the projection lens 1207 being a projection optical system so that an image is displayed in an enlarged manner.

The liquid crystal light valve 1210 is a valve to which the above-mentioned liquid crystal device 500 is applied. The liquid crystal device 500 is disposed between a pair of light polarizing elements disposed in a crossed-Nicols state at an incident side and an exit side of the color light with a gap. The same applies to the other liquid crystal light valves 1220 and 1230.

As the electronic apparatus on which the liquid crystal device 500 is mounted includes, besides the projector 1000, various electronic apparatus such as a head-up display (HUD), a head-mounted display (HMD), a smartphone, an electrical view finder (EVF), a mobile mini projector, an electronic book, a mobile phone, a mobile computer, a digital camera, a digital video camera, a display, onboard equipment, audio equipment, an exposure device, and a lighting equipment can be named.

As has been described above, the liquid crystal device 500 of the first embodiment includes the liquid crystal panel 100, and the printed circuit board 110 electrically coupled to the terminal portions 40 of the liquid crystal panel 100 by the electrically conductive particles 71 arranged in a state of being aligned as viewed in plan view. The terminal portion 40 includes the plurality of panel terminals 50 arranged along the first direction d1 extending along the one side 10a of the liquid crystal panel 100. The panel terminal 50 has the long sides 50L extending along the second direction d2 obliquely intersecting with the first direction d1 and the short sides 50S extending along the fourth direction d4 intersecting with the second direction d2, and the arrangement direction of the electrically conductive particles 71 is arranged along the third direction d3 intersecting with the second direction d2.

With such a configuration, the extending direction of the panel terminal 50 and the arrangement direction of the electrically conductive particles 71 are different from each other and hence, for example, when the particle aligned type anisotropic conductive film 70 is adhered to the region where the terminal portion 40 of the liquid crystal panel 100 is disposed and the liquid crystal panel 100 and the printed circuit board 110 are adhered to each other by compression bonding, it is possible to suppress the occurrence of a phenomenon that the number of electrically conductive particles 71 sandwiched between the panel terminal 50 and the external terminal 60 is extremely decreased or the number of electrically conductive particles 71 becomes irregular among the terminals. Accordingly, it is possible to suppress the occurrence of a connection failure between the liquid crystal panel 100 and the printed circuit board 110.

Further, although the selection of the particle aligned type anisotropic conductive film 70 that conforms with the pitch of the panel terminals 50 has been considered as a crucial task the number of selections of the particle aligned type anisotropic conductive film 70 is increased and hence, particularly, the arrangement direction of the electrically conductive particles 71 in the particle aligned type anisotropic conductive film 70 can be set as desired in conformity with an inclination angle of the panel terminal 50. The arrangement density of the electrically conductive particles 71 in the length and width directions of the panel terminal 50 can be made effectively smaller than the arrangement pitch of the electrically conductive particles 71 on the particle aligned type anisotropic conductive film 70 and hence, the electrical connectivity with the printed circuit board 110 is also improved. Further, according to this configuration, it is possible to provide an electro-optical device and an electronic apparatus capable of flexibly coping with narrowing of the pitch of the terminals.

By providing the liquid crystal device 500 described above, it is possible to provide the projector 1000 capable of performing stable display.

Second Embodiment

Figure 9:
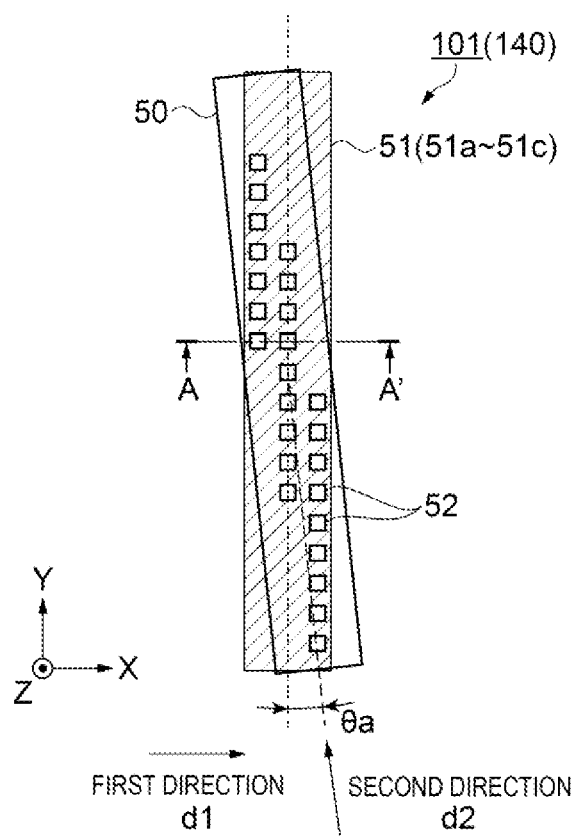
FIG. 9 is a plan view illustrating a configuration of a terminal portion of a liquid crystal panel of a second embodiment.

As illustrated in FIG. 9, a liquid crystal panel 101 of a second embodiment differs from the liquid crystal panel 100 of the first embodiment in that an angle of a long side of a panel terminal 50 in contact with electrically conductive particles 71 is made different from an angle of a long side of a lower electrode 51 disposed below the panel terminal 50. Other configurations of the liquid crystal panel 101 are substantially equal to the corresponding configurations of the liquid crystal panel 100. Accordingly, in the second embodiment, parts which make the second embodiment different from the first embodiment are described in detail, and the descriptions of other parts identical with the corresponding parts in the first embodiment are omitted when appropriate.

Figure 10:
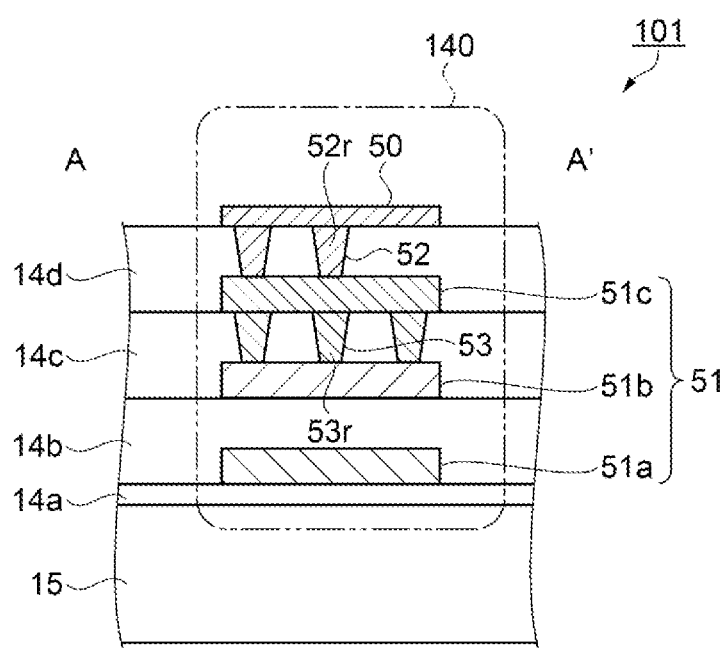
FIG. 10 is a cross-sectional view of the terminal portion illustrated in FIG. 9 taken along a line A-A' in FIG. 9.

As illustrated in FIG. 9 and FIG. 10, a terminal portion 140 of the liquid crystal panel 101 of the second embodiment includes a plurality of lower electrodes 51a to 51c. For example, in the terminal portion 140, an insulating layer 14a, the lower electrode 51a that is a part of a conductive layer, an interlayer insulating layer 14b, the lower electrode 51b that is a part of the conductive layer, an interlayer insulating layer 14c, the lower electrode 51c that is a part of the conductive layer, an interlayer insulating layer 14d, and the panel terminal 50 are disposed on a base substrate 15 in this order. Here, the lower electrodes 51a to 51c are collectively referred to as the lower electrode 51.

The panel terminal 50 and the lower electrode 51 are electrically coupled to each other via relay electrodes 52r each of which is disposed in a contact hole 52. The lower electrode 51b and the lower electrode 51c are also electrically coupled to each other via relay electrodes 53r each of which is disposed in a contact hole 53. Here, the insulating layer 14a is a gate insulating film of a thin film transistor formed on an element substrate 10. For example, the lower electrode 51a is a gate electrode layer of a thin film transistor formed on the element substrate 10, and is also used as a gate electrode line disposed in a display region of the element substrate 10. For example, the lower electrode 51b is a source electrode or a drain electrode layer of the thin film transistor formed on the element substrate 10, and is used for connection between the thin film transistors or used as signal lines disposed in the display region of the element substrate 10. For example, the lower electrode 51c is used as a holding capacitor line disposed in the display region, and is also used as wiring for assisting connection to the lower electrode 51b. For example, the panel terminal 50 is a pixel electrode layer formed on the element substrate 10. Here, although the contact structure for connecting the lower electrode 51a and the lower electrode 51b to each other is not illustrated, in a peripheral circuit formed on the element substrate 10, the lower electrode 51a and the lower electrode 51b are connected to each other by the contact structure. Although the interlayer insulating layer 14b includes a capacitor layer or the like that constitutes the holding capacitor provided to the pixels in the display region, for the sake of convenience of the description, the interlayer insulating layer 14b is illustrated as a single insulating layer by omitting such layers.

In the same manner as the first embodiment, the panel terminal 50 is disposed in an inclined manner at an angle θa with respect to an end side 10b of the element substrate 10 extending along the Y direction (see FIG. 3). The lower electrode 51 is disposed without inclination with respect to an end side 10b of the element substrate 10 extending along the Y direction. Specifically, the long side of the panel terminal 50 is disposed along the second direction d2, and the long sides of the lower electrodes 51a to 51c are disposed along the Y direction (third direction d3) which is a direction intersecting with the first direction d1 at a right angle. Here, the lower electrode 51 may be configured such that all of the lower electrodes 51a to 51c are arranged without inclination or some of the lower electrodes 51a to 51c are disposed in an inclined manner at an angle θa in the same manner as the panel terminal 50.

The plurality of contact holes 52 are arranged in a region where the panel terminal 50 and the lower electrode 51 overlap each other as viewed in plan view, and are arranged along the long side of the lower electrode 51. With such a configuration, the contact holes 52 are disposed in the region of the lower electrode 51 in an unevenly distributed manner.

When the entire terminal portion 140 formed of the panel terminal 50, the lower electrode 51, the contact holes 52 and the like is simply inclined, there arises a problem that a profile which defines the terminal portion 140 does not agree with a working grid at the time of forming a photo mask. In this case, the photo mask has an unintended profile shape and an unintended size and hence, a defect occurs particularly in fine processing for forming the contact holes 52 or the like whereby irregularity occurs in contact resistance, for example.

Further, as a result of changing the particle aligned type anisotropic conductive film 70 to be used due to the abandonment of the use of the particle aligned type anisotropic conductive film 70, there is a case where it is desirable to change the inclination angle of the terminal portion 140. Specifically, there is a case where an arrangement pitch of electrically conductive particles 71 in the alternative is different and hence, it is desirable to change the effective arrangement density of the electrically conductive particles 71 in the length direction and the width direction of the panel terminal 50. In such a case, when the whole structure of the terminal portion 140 is changed, there also arises a cost problem. However, by forming the terminal portion 140 as described above, components other than the panel terminal 50 configured to contact the electrically conductive particles 71 can be formed into an on-grid profile. Further, since the contact holes 52 are distributed in a non-uniform manner in the region of the lower electrode 51, even in a case where the inclination angle is changed from an angle θa to an angle other than the angle θa, for example, the contact holes 52 are not exposed so that the occurrence of problems on processes can be prevented. Accordingly, it is sufficient to change only the photomask of the panel terminal 50.

As described above, the terminal portion 140 of the liquid crystal panel 101 of the second embodiment includes the panel terminal 50 configured to contact the electrically conductive particles 71, and the lower electrodes 51a to 51c disposed below the panel terminal 50 and overlap with the panel terminal 50 as viewed in plan view. The long side of the panel terminal 50 is arranged along the second direction d2, and the long sides of the lower electrodes 51a to 51c are arranged along the third direction d3 intersecting with the first direction d1 at a right angle.

With such a configuration, the panel terminal 50 is inclined and hence, it is possible to suppress the occurrence of a phenomenon that the number of electrically conductive particles 71 sandwiched between the panel terminal 50 and the external terminal 60 is extremely decreased or the number of electrically conductive particles 71 becomes irregular among the respective terminals. Further, it is possible to easily control the fine processing such as the manufacture of the contact holes 52 and hence, it is possible to suppress the occurrence of irregularity in contact resistance. The configuration can also cope with a change in the inclination angle of the panel terminal 50 at a low cost.

Here, the disclosure is not limited to the configurations of the first and second embodiments described above, and the following configurations may also be adopted. FIG. 11 to FIG. 15 are plan views illustrating configurations of terminal portions 141, 142, 143, 144, and 145 of modifications 1 to 5.

Figure 11:
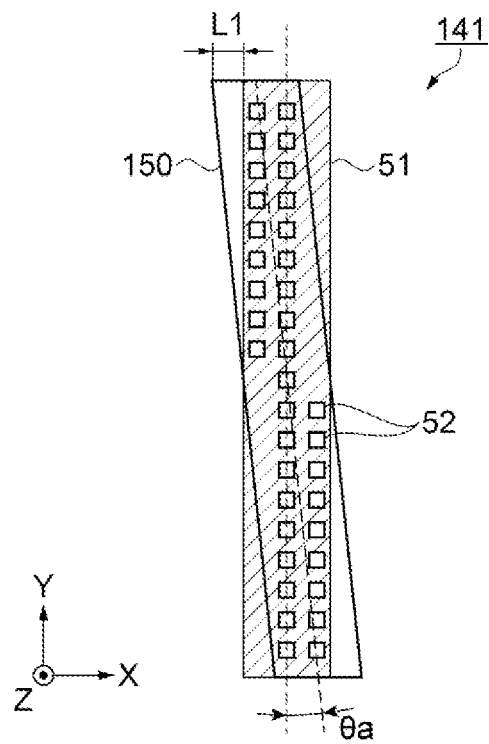
FIG. 11 is a plan view illustrating a configuration of a terminal portion of a liquid crystal panel of a modification 1.

As illustrated in FIG. 11, in the terminal portion 141 of the modification 1, a panel terminal 150 is formed in a parallelogram shape. Specifically, in a case where the panel terminal 50 is simply rotated by an angle θa as in the case of the terminal portion 140 of the second embodiment, there may be a case where vertexes of a rectangular shape of the panel terminal 50 do not agree with a working grid at the time of forming a photomask. In this case, the photomask having an unintended size may be formed and hence, a situation where the panel terminals 50 slightly differ from each other in size occurs. However, by forming the panel terminal 150 in such a shape, the panel terminal 150 can be formed in an on-grid profile in a state where the panel terminal 150 is inclined and hence, it is possible to ensure an area of the panel terminal 150 in a stable manner.

In this manner, it is preferable that the shape of the panel terminal 150 be a parallelogram shape. According to such a configuration, the shape of the panel terminal 150 is the parallelogram shape and hence, the extending direction of the panel terminal 150 can be inclined with respect to the one side 10a of the liquid crystal panel 100 and, at the same time, the panel terminal 150 can be formed with certainty.

Figure 12:
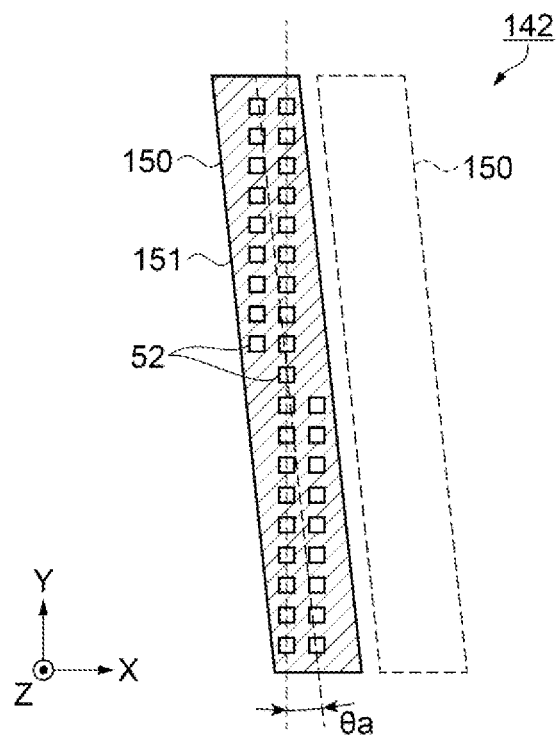
FIG. 12 is a plan view illustrating a configuration of a terminal portion of a liquid crystal panel of a modification 2.

As illustrated in FIG. 12, in the terminal portion 142 of the second modification, a lower electrode 151 is disposed in an inclined manner in conformity with the inclination of a panel terminal 150. For example, in the modification 1 illustrated in FIG. 11, a length of the panel terminal 150 in a long side direction is set to 500 μm, for example, and the inclination angle θa is set to 4°. An arrangement pitch in the X direction of the structural bodies each formed of the lower electrode 51 is set to 50 μm, a width of the structural body is set to 35 μm, and a space between the structural bodies is set to 15 μm. In this case, a size L1 becomes 18 μm (250 μm×tan 4°=18 μm).

In this case, the size L1 becomes larger than the space (15 μm) between the structural bodies each formed of the lower electrode 51 and hence, the panel terminal 150 overlaps with a lower electrode 51 of a terminal portion 141 disposed adjacently to the panel terminal 150 as viewed in plan view. Since a pressure is applied during mounting the panel terminal 150, depending on a thickness of the insulating layer, a short circuiting may occur between the lower electrode 51c and the panel terminal 150, for example. Accordingly, as in the case of the modification 2 illustrated in FIG. 12, at least a portion or the entirety of the lower electrode 151 is formed in a parallelogram shape in the same manner as the panel terminal 150. With such a configuration, it is possible to avoid the overlapping between the panel terminal 150 and the lower electrode 151 of the terminal portion 142 disposed adjacently to the panel terminal 150 with respect to the terminal portions 142 disposed adjacently to each other.

In this manner, it is preferable that the panel terminal 150 do not overlap with the lower electrode 151 of the terminal portion 142 disposed adjacently to the panel terminal 150 as viewed in plan view. According to such a configuration, the panel terminal 150 does not overlap with the lower electrode 151 of the terminal portion 142 disposed adjacently to the panel terminal 150 and hence, when the liquid crystal panel 100 and the printed circuit board 110 are adhered to each other by pressure bonding, it is possible to suppress the occurrence of a phenomenon that the panel terminal 150 and the lower electrode 151 of the adjacent terminal portion 142 are short-circuited due to a stress during the pressure-bonding.

Figure 13:
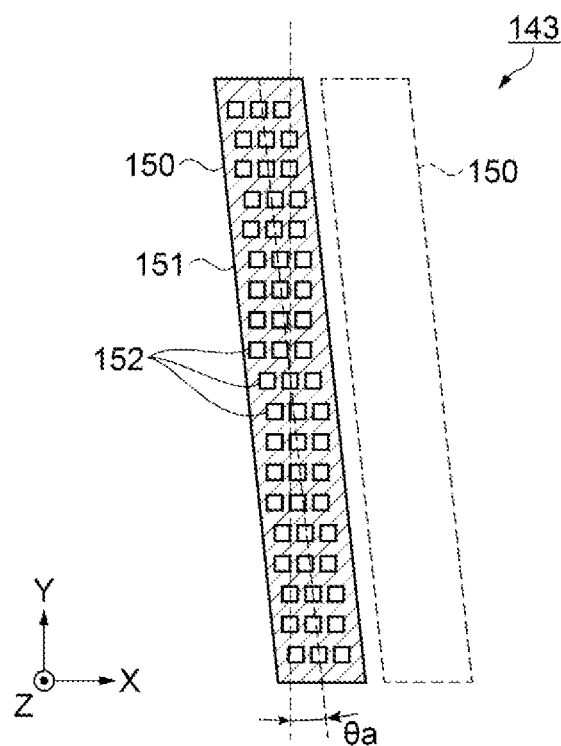
FIG. 13 is a plan view illustrating a configuration of a terminal portion of a liquid crystal panel of a modification 3.

As illustrated in FIG. 13, in the terminal portion 143 of the third modification, contact holes 152 are disposed on the whole surface of a panel terminal 150 while slightly moving an X coordinate along a shape of the panel terminal 150. Specifically, the contact holes 152 are disposed substantially along one side of a parallelogram shape of the panel terminal 150.

In this case, drafting can be performed by preparing and executing a program in which an imaginary line on which the contact holes 152 are disposed is set, an X coordinate closest to the imaginary line is mechanically calculated by putting the whole X coordinate into values of a working grid for forming the photomask at each arrangement pitch in the Y direction of the contact holes 152 so that a basic profile of the contact holes 152 is disposed. Functions for preparing and executing an arbitrary drafting program are implemented in a commercially available drafting software for preparing a photomask.

As described above, it is preferable that the plurality of contact holes 152 disposed between the panel terminal 150 and the lower electrode 151 be provided, and the plurality of contact holes 152 be disposed along the second direction.

With such a configuration, it is possible to prevent the lower electrode 51 from being formed in an off-grid profile. Further, since the contact holes 152 are disposed over the substantially entire surface of the panel terminal 150 (the lower electrode 151), the number of contact holes 152 can be increased whereby the certainty in electrical connection between the panel terminal 150 and the lower electrode 151 can be enhanced.

Alternatively, it is preferable that the contact holes 152 be disposed at random at a pitch in a predetermined range from a pitch A to a pitch B. The pitch A is a space rule determined by the processing performance of the contact holes 152, and is set to 1 μm, for example. The pitch B is determined by a size and the number of contact holes to be placed, but is set to 10 μm, for example. With such a setting, it is possible to keep the space rule, and at least one contact hole can be disposed in a space within a range of 10 μm.

According to such a configuration, it is possible to increase the number of contact holes 152 so as to allow the contact holes 152 to be within the parallelogram shape so that the electrical resistance can be decreased. Accordingly, supply signals and supply power can be performed in a stable manner.

Further, in managing the mounting process of the printed circuit board 110, it may be desirable to confirm the arrangement direction of the electrically conductive particles 71. The observation of the electrically conductive particles 71 can be performed from the back surface of the element substrate 10 when the element substrate 10 is a transparent substrate made of quartz, however, when the element substrate 10 is formed of a silicon substrate or the like, the silicon substrate is opaque and hence, the electrically conductive particles 71 are observed from a film forming surface side, that is, a printed circuit board 110 side. At this time, when the contact holes 152 are arranged at random, in observing the arrangement state of the electrically conductive particles 71 on the panel terminal 150 using a microscope or the like, it is possible to easily distinguish the electrically conductive particles 71 from the contact holes 152. For example, if three structural bodies arranged at equal intervals are found, it is possible to easily determine that such a configuration is an arrangement axis of the electrically conductive particles 71.

Figure 14:
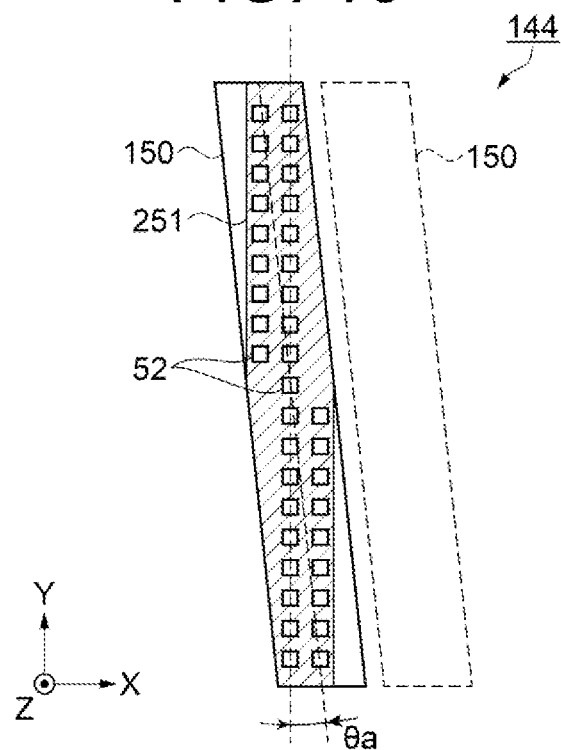
FIG. 14 is a plan view illustrating a configuration of a terminal portion of a liquid crystal panel of a modification 4.

As illustrated in FIG. 14, in the terminal portion 144 of the modification 4, a lower electrode 251 is formed to have a shape obtained by removing portions of the lower electrode 51 protruding from the shape of the panel terminal 150 as in the case of the terminal portion 141 of the modification 1 illustrated in FIG. 11. Specifically, in FIG. 14, at least a part of or the entirety of portions of the lower electrode close to the terminal portion 141 disposed adjacently to the lower electrode is cut out thus forming the lower electrode 251 having a modified hexagonal shape. With such a configuration, it is possible to avoid overlapping between the panel terminal 150 and the lower electrode 251 of the terminal portion 144 disposed adjacently to the panel terminal 150 with respect to the terminal portions 144 disposed adjacently to each other and hence, the occurrence of a short-circuiting between the panel terminal 150 and the lower electrode 251 can be avoided.

Figure 15:
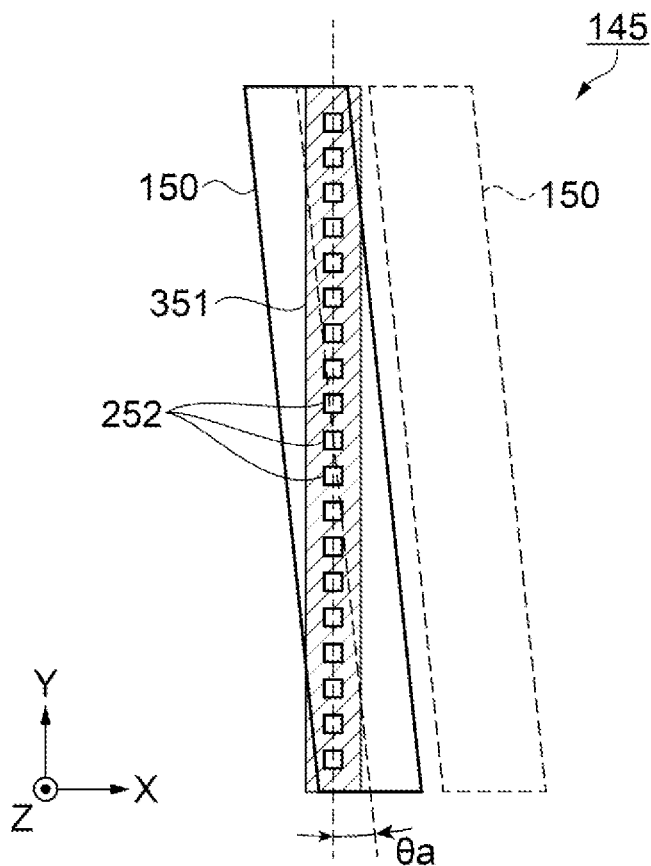
FIG. 15 is a plan view illustrating a configuration of a terminal portion of a liquid crystal panel of a modification 5.

As illustrated in FIG. 15, in the terminal portion 145 of the modification 5, a lower electrode 351 is formed with a width corresponding to a size of a contact hole 252. Specifically, the contact holes 252 are arranged in one row parallel to the Y direction of the element substrate 10. For example, signals supplied from the terminal portion 145 include logic-system signals such as so-called clock signals, and these signals are typically inputted to a buffer circuit which is an internal circuit of a display panel and hence, there is no problem even when a contact resistance becomes relatively large. In this case, a width of the lower electrode 351 may be configured to be smaller than a width of the panel terminal 150 with respect to a portion or the entirety of the lower electrode 351 other than the panel terminal 150. Even with such a configuration, it is possible to avoid the overlapping between the panel terminal 150 and a lower electrode 351 of a terminal portion 145 disposed adjacently to the terminal panel 150 and hence, the occurrence of a short-circuiting between the panel terminal 150 and the lower electrode 351 of the adjacent terminal portion 145 can be avoided. Here, the contact holes 252 may be arranged in one row in conformity with the inclination of the panel terminal 150, and the lower electrode 351 may also be formed in conformity with the inclination of the contact holes 252. The contact holes 252 may be arranged in plural rows.

In the embodiments, when the particle aligned type anisotropic conductive film 70 is adhered to the liquid crystal panel 100, the electrically conductive particles 71 are arranged in a matrix array along the direction (first direction d1) of the one side 10a of the element substrate and the direction (third direction d3) orthogonal to the direction (first direction d1). However, the disclosure is not limited to such a configuration. The electrically conductive particles 71 may be arranged in an inclined manner with respect to the direction of the one side 10a of the element substrate and the direction orthogonal to the direction of the one side 10a. Alternatively, a particle aligned type anisotropic conductive film in which the electrically conductive particles 71 are not arranged in a matrix array and are aligned at the center and vertexes of respective sides of the regular hexagonal shape may be adopted. In any modes, according to the configuration of this disclosure, the relationship between the arrangement direction of the electrically conductive particles 71 and the inclination angle of the panel terminal 50 and the like can be set arbitrarily and hence, it is possible to adopt the optimal design.

In the embodiments, the printed circuit board 110 is mounted on the liquid crystal panel 100 using the particle aligned type anisotropic conductive film 70. However, the disclosure is not limited to such a configuration. For example, a mode of the chip on glass (COG) in which a driving IC is mounted on the element substrate 10 of the liquid crystal panel 100 using the particle aligned type anisotropic conductive film 70 may be adopted. Further, a mode of the chip on film (COF) may be adopted.

Further, the electro-optical device to which the disclosure is applied is not limited to the liquid crystal device 500 as described above, for example, the disclosure may also be applicable to an organic EL device, a head-up display (HUD), an electronic paper (EPD) or the like.

What is claimed is:
1. An electro-optical device comprising:
an electro-optical panel; and
a printed circuit board electrically coupled to a terminal portion of the electro-optical panel by electrically conductive particles arranged in a state of being aligned as viewed in plan view, wherein the terminal portion has a plurality of terminals arranged along a first direction extending along one side of the electro-optical panel and disposed on an overhang portion of the electro-optical panel, the terminal has a long side extending along a second direction obliquely intersecting with the first direction, and a short side extending along a direction intersecting with the second direction, the arrangement direction of the electrically conductive particles is arranged along a third direction intersecting with the second direction, and all of the plurality of terminals are parallel to each other and entirely inclined with respect to the third direction.

2. The electro-optical device according to claim 1, wherein the terminal portion includes the terminal configured to contact the electrically conductive particles, and a lower electrode that is disposed below the terminal and overlaps with the terminal as viewed in plan view, and the long side of the terminal is arranged along the second direction, and a long side of the lower electrode is arranged along the third direction intersecting with the first direction.

3. The electro-optical device according to claim 2, wherein the terminal does not overlap with a lower electrode of a terminal portion adjacent to the terminal as viewed in plan view.

4. The electro-optical device according to claim 2 comprising a plurality of contact holes disposed between the terminal and the lower electrode, and the plurality of contact holes are disposed along the second direction.

5. The electro-optical device according to claim 4, wherein the contact holes are arranged at random at a pitch in a predetermined range from a pitch A to a pitch B.

6. The electro-optical device according to claim 1, wherein a shape of the terminal is a parallelogram shape.

7. An electronic apparatus, comprising:

the electro-optical device according to claim 1.

* * * * *